(12) United States Patent
Nishita et al.

(10) Patent No.: US 11,754,679 B2
(45) Date of Patent: Sep. 12, 2023

(54) ELECTRO-OPTICAL DISTANCE METER

(71) Applicant: TOPCON CORPORATION, Tokyo (JP)

(72) Inventors: Nobuyuki Nishita, Tokyo (JP); Takashi Takahashi, Tokyo (JP); Tatsuya Kojima, Tokyo (JP); Saki Horita, Tokyo (JP)

(73) Assignee: TOPCON CORPORATION, Tokyo (JP)

( * ) Notice: Subject to any disclaimer, the term of this patent is extended or adjusted under 35 U.S.C. 154(b) by 1110 days.

(21) Appl. No.: 16/365,523

(22) Filed: Mar. 26, 2019

(65) Prior Publication Data

US 2019/0302233 A1 Oct. 3, 2019

(30) Foreign Application Priority Data

Mar. 28, 2018 (JP) .................................. 2018-061906

(51) Int. Cl.
*G01S 7/48* (2006.01)
*G01S 7/481* (2006.01)
*G02B 26/00* (2006.01)
*G01S 17/10* (2020.01)

(52) U.S. Cl.
CPC ............ *G01S 7/4814* (2013.01); *G01S 17/10* (2013.01); *G02B 26/005* (2013.01)

(58) Field of Classification Search
None
See application file for complete search history.

(56) References Cited

U.S. PATENT DOCUMENTS

2005/0270672 A1  12/2005  Feenstra et al.
2007/0188676 A1  8/2007  Choi et al.

FOREIGN PATENT DOCUMENTS

| CA | 2555766 A1 * | 3/2007 | ............... G01C 3/08 |
| EP | 3447535 A1 * | 2/2019 | ............ G01B 11/00 |
| JP | H04-177195 A | 6/1992 | |
| JP | 2006-500614 A | 1/2006 | |
| JP | 2007-219510 A | 8/2007 | |
| JP | 4707365 B2 | 6/2011 | |

OTHER PUBLICATIONS

Notice of Reasons for Refusal dated Nov. 9, 2021, in connection with Japanese Patent Application No. 2018-061906, 6 pgs (including translation).

* cited by examiner

*Primary Examiner* — Hovhannes Baghdasaryan
(74) *Attorney, Agent, or Firm* — CHIESA, SHAHINIAN & GIANTOMASI PC

(57) ABSTRACT

An electro-optical distance meter includes a light source configured to emit light for distance measurement, a detector configured to receive the light and generate a distance measurement signal, a calculator configured to measure the distance from the distance measurement signal, an external optical path configured to guide the light from the light source to a target as measurement light, an internal optical path configured to guide the light from the light source directly to the detector as reference light, and a liquid shutter that can select one of the external and internal optical paths as the optical path through which the light from the light source travels by switching a region of light-blocking liquid.

5 Claims, 4 Drawing Sheets

ELECTRO-OPTICAL DISTANCE METER

CROSS-REFERENCE TO RELATED APPLICATION

This application claims priority to Japanese Patent Application No. 2018-061906 filed on Mar. 28, 2018, the entire disclosure of which is incorporated by reference herein.

The present disclosure relates to an electro-optical distance meter including a liquid shutter.

BACKGROUND

Electro-optical distance meters have recently been used to make surveys necessary for construction or map production. Typically, an electro-optical distance meter measures a distance by irradiating a target with measurement light emitted from a light source, receiving the measurement light reflected from the target with a light receiving unit, and electronically analyzing the received light.

To measure a distance, the electro-optical distance meter changes the intensity of the measurement light (i.e., modulates the measurement light), and measures a phase difference that indicates how much the waveform of the reflected light returning to the light receiving unit deviates from the waveform of the outgoing light from a light emitter. The measurement light is modulated through modulation of a light source such as a lamp based on a reference signal.

The measurement light is subjected to phase shift due to a change in output caused by, for example, a thermal drift. In such a case, the measurement light cannot provide correct measurement data. To obtain correct measurement data, the electro-optical distance meter includes an internal optical path for use in measurement based on reference light so as to correct a measurement value.

An optical path for use in regular distance measurement based on measurement light is referred to as an external optical path, and an optical path for use in correction of a measurement value based on reference light is referred to as an internal optical path. To switch between the external optical path and the internal optical path, the electro-optical distance meter includes a shutter mechanism configured to select either one of the optical paths.

An electro-optical distance meter including such a shutter mechanism to constantly conduct correct distance measurement is described in, for example, Japanese Patent No. 4707365.

The electro-optical distance meter disclosed in Japanese Patent No. 4707365 includes, for example, a mechanical shutter mechanism (mechanical shutter) to switch between the external optical path and the internal optical path. However, using a mechanical shutter to measure a distance as described in Japanese Patent No. 4707365 leads to a loss of measurement time in switching between the measurement light and the reference light. This is because opening and closing the mechanical shutter takes time, and the measurement data cannot be acquired until the shutter completes its opening and closing operations.

In addition, the mechanical shutter may be mechanically worn out after a long use or may be damaged by an external impact. This may lead to a malfunction of the shutter and make the shutter no longer operable.

SUMMARY

Embodiments of the present disclosure have been made in view of the foregoing background. An electro-optical distance meter described in the present disclosure can ensure a longer measurement time and higher operational reliability.

The electro-optical distance meter according to an embodiment of the present disclosure includes: a light source configured to emit light for distance measurement; a detector configured to receive the light and generate a distance measurement signal; a calculator configured to measure the distance from the distance measurement signal; an external optical path configured to guide the light from the light source to a target as measurement light; an internal optical path configured to guide the light from the light source directly to the detector as reference light; and at least one liquid shutter configured to select, by switching a region of light-blocking liquid, one of the external optical path or the internal optical path as the optical path through which the light from the light source travels.

The electro-optical distance meter according to the claimed embodiments can provide a longer measurement time and higher operational reliability.

DETAILED DESCRIPTION

Embodiments of the present disclosure will be described below with reference to the accompanying drawings.

Figure 1:
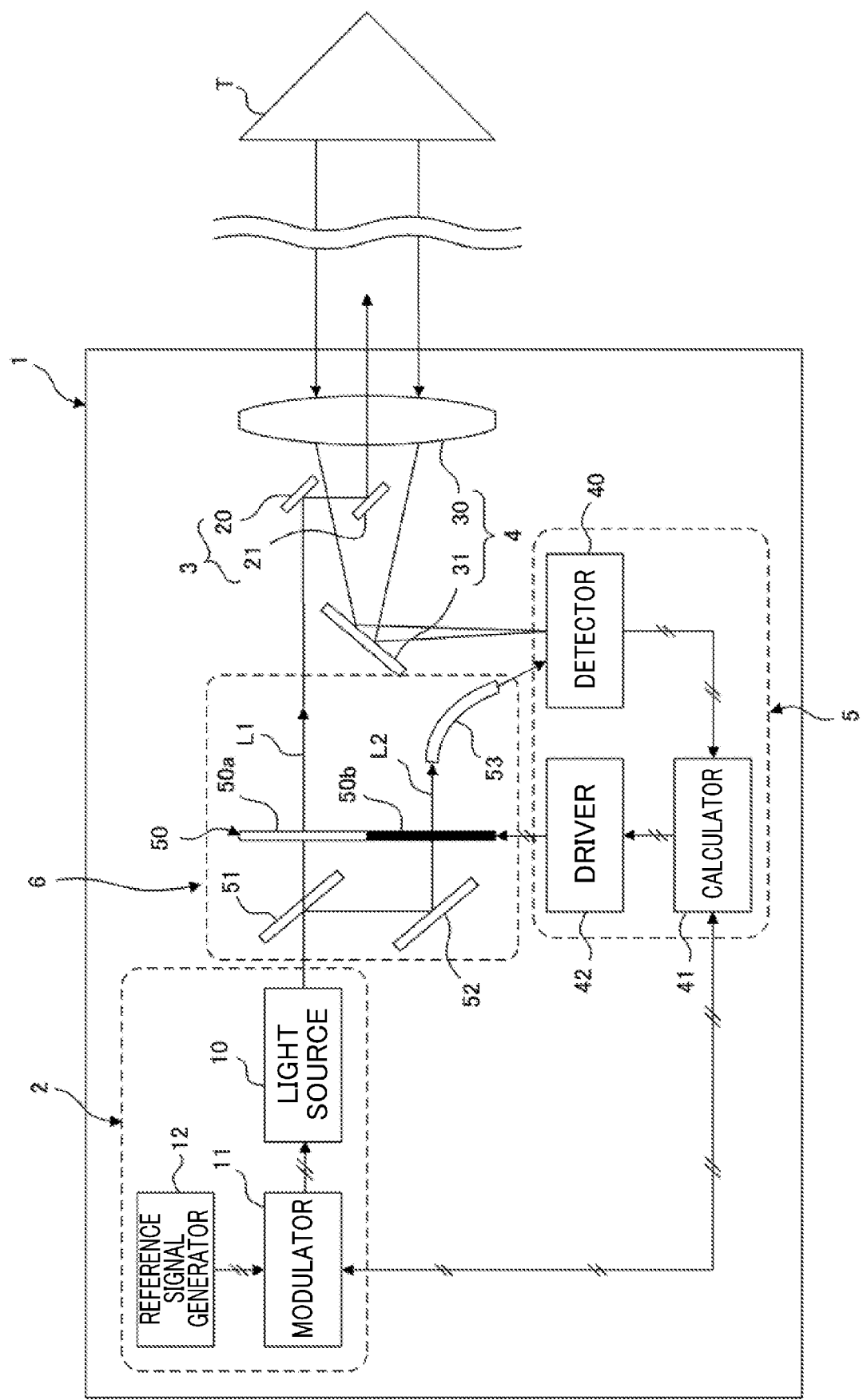
FIG. 1 is a schematic diagram illustrating a general configuration of an electro-optical distance meter according to an embodiment of the present disclosure.

FIG. 1 illustrates a general configuration of an electro-optical distance meter according to this embodiment. The configuration of this embodiment will be described with reference to FIG. 1.

As illustrated in FIG. 1, the electro-optical distance meter 1 according to this embodiment includes, as main units, a light emitting unit 2, a light transmitting optical system 3, a light receiving optical system 4, a control unit 5, and an optical path switching unit 6.

The light emitting unit 2 includes a light source 10, a modulator 11, and a reference signal generator 12. The light source 10 emits light for distance measurement (specifically, light based on which a distance can be measured). Examples of the light source 10 include a lamp, a light-emitting diode (LED), a laser diode, and other light emitting means. The light source 10 is connected to the modulator 11, and the modulator 11 is connected to the reference signal generator 12.

The reference signal generator 12 is, for example, a clock oscillator. The reference signal generator 12 can generate a reference signal having a predetermined frequency. The modulator 11 can modulate an input signal and output a modulated signal. The modulator 11 modulates the reference signal generated by the reference signal generator 12 and transmits the modulated signal to the light source 10. The light source 10 then emits modulated light (measurement light, reference light) for distance measurement.

The light transmitting optical system 3 includes a first mirror 20 and a second mirror 21. The first mirror 20 and the second mirror 21 reflect the measurement light emitted from the light source 10. The light is then transmitted from the electro-optical distance meter 1 to a target T. The target T may be a retroreflector such as a prism, or any other objects that reflect a laser beam.

The light receiving optical system 4 includes an objective lens 30 and a third mirror 31. The objective lens 30 collects the measurement light reflected from the target T and the third mirror 31 reflects the collected light to a detector 40, which will be described below.

The control unit 5 includes the detector 40, a calculator 41, and a driver 42.

The detector 40 includes a light receiving element such as a photodiode. The detector 40 converts the light that has entered in the light receiving element into an electric signal that is called a distance measurement signal.

The calculator 41 is connected to the detector 40 and the modulator 11. The calculator 41 receives the distance measurement signal from the detector 40 and a reference signal from the modulator 11. The calculator 41 includes a central processing unit (CPU) and a phase meter. The calculator 41 calculates a phase difference between the distance measurement signal and the reference signal, and calculates a distance from the phase difference. The distance to the target T calculated by the calculator 41 can be displayed on a display unit, which is not illustrated.

The driver 42 is connected to the calculator 41 and a liquid shutter 50, which will be described below. The driver 42 drives the liquid shutter 50 while being under the control of the calculator 41.

The optical path switching unit 6 includes the liquid shutter 50, a semitransparent mirror 51, a fourth mirror 52, and an optical fiber 53.

The liquid shutter 50 includes an electrowetting device that has a sealed, hollow, plate-like casing and encloses light-transmitting liquid in one region (upper portion in FIG. 1) of the casing and light-blocking liquid in the other region (lower portion in FIG. 1) of the casing. In other words, the liquid shutter 50 has a light-transmitting region 50a and a light-blocking region 50b. In response to application of voltage by the driver 42, the liquid shutter 50 can cause the light-transmitting region 50a and the light-blocking region 50b to switch places instantaneously. The liquid shutter 50 according to this embodiment is comprised of a single electrowetting device, and disposed such that one region of the liquid shutter 50 is located across an external optical path L1 and the other region of the liquid shutter 50 is located across an internal optical path L2. The liquid shutter 50 includes a light-blocking liquid having, for example, a neutral density (ND) level of 5 to 6.

The semitransparent mirror 51 reflects part of the light emitted from the light source 10 to the fourth mirror 52 as reference light. The fourth mirror 52 reflects the reference light to the optical fiber 53 through the liquid shutter 50. The optical fiber 53 guides the reference light to the detector 40.

In the electro-optical distance meter 1 having the configuration described above, the external optical path L1 guides the light from the light source 10 to the target T as the measurement light, and the internal optical path L2 guides the light from the light source 10 directly to the detector 40 as the reference light. One of the external optical path L1 or the internal optical path L2 can be selected as the optical path through which the light from the light source 10 travels, by switching of the light-blocking region 50b of the liquid shutter 50 with respect to the light from the light source 10.

Specifically, when the light-transmitting region 50a of the liquid shutter 50 is positioned across the external optical path L1 and the light-blocking region 50b is positioned across the internal optical path L2 as illustrated in FIG. 1, the light from the light source 10 travels, as the measurement light, through the light transmitting optical system 3 and the light receiving optical system 4, and then is received by the detector 40.

On the other hand, when the light-transmitting region 50a of the liquid shutter 50 is positioned across the internal optical path L2 and the light-blocking region 50b is positioned across the external optical path L1, the light from the light source 10 travels, as the reference light, through the optical path switching unit 6, and then is received by the detector 40.

The calculator 41 measures a distance based on the reference light in the same manner as the distance measurement based on the measurement light passing through the external optical path L1, so that the calculator 41 calculates an error arising in the electro-optical distance meter 1 at this time. When calibration is needed, the calculator 41 transmits a switching signal for switching the external optical path L1 and the internal optical path L2 to the driver 42 so as to switch the liquid shutter 50, and calibrates the error based on the reference light. The calibration timing is determined in accordance with, for example, a change in temperature or how much time has passed since the last calibration.

Figure 2:
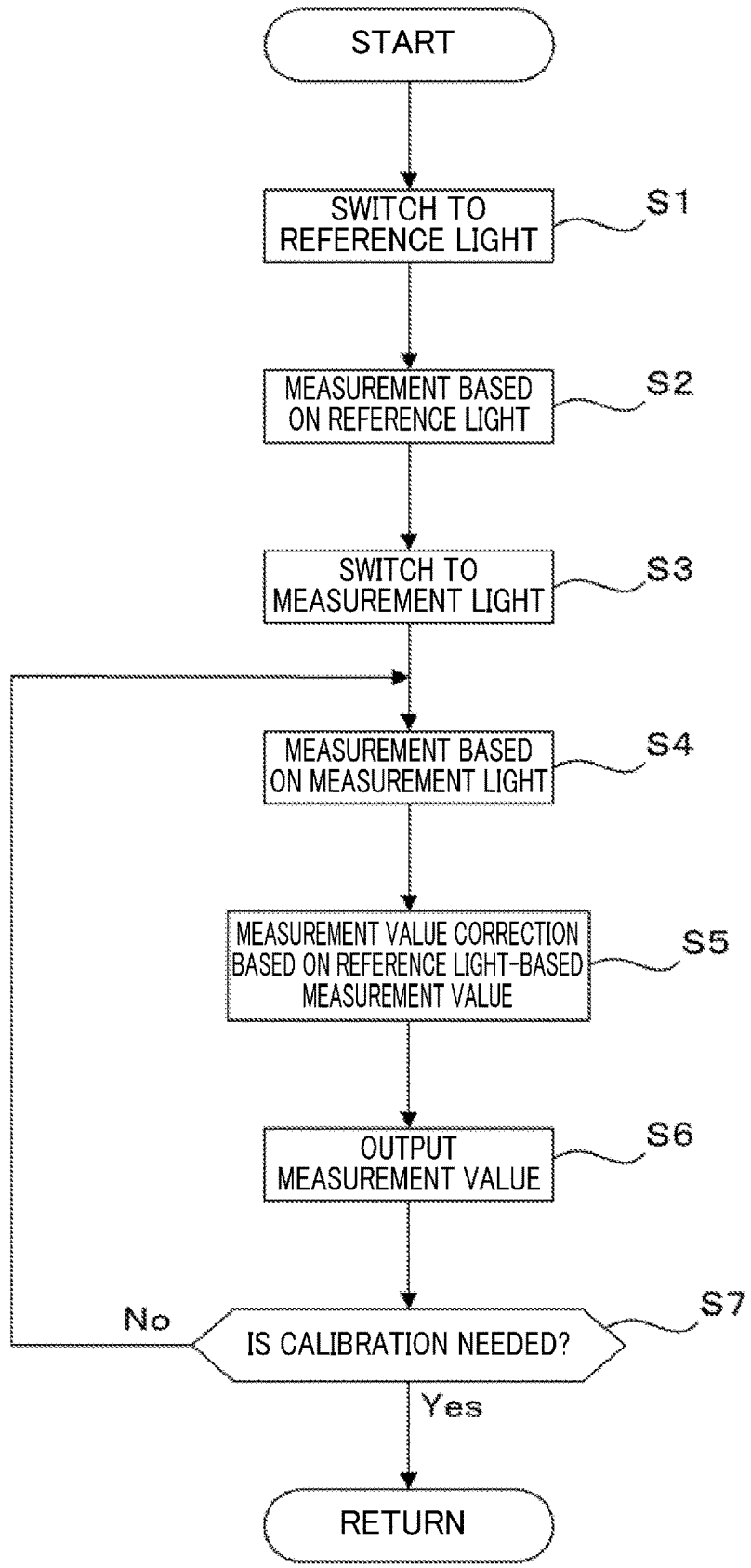
FIG. 2 is a flowchart illustrating a distance measurement control routine performed by a control unit of the electro-optical distance meter.

FIG. 2 is a flowchart illustrating a distance measurement control routine performed by the control unit 5. It is described next how the distance measurement control is carried out according to this embodiment, with reference to the flowchart.

First, the control unit 5 starts the distance measurement operation of the electro-optical distance meter 1. In Step S1, the driver 42 performs switching to position the light-blocking region 50b of the liquid shutter 50 across the external optical path L1. Accordingly, the light from the light source 10 passes through the light-transmitting region 50a of the liquid shutter 50 as the reference light, and travels through the internal optical path L2 to enter the detector 40.

In Step S2, the calculator 41 measures a distance based on the reference light received by the detector 40. The distance measurement value based on the reference light is stored in a storage unit, which is not illustrated.

In Step S3, the driver 42 performs switching to position the light-blocking region 50b of the liquid shutter 50 across the internal optical path L2. Accordingly, the light from the light source 10 passes through the light-transmitting region 50a of the liquid shutter 50 as the measurement light, and travels through the external optical path L1 to enter the detector 40.

In Step S4, the calculator 41 measures a distance based on the measurement light received by the detector 40.

In Step S5, the calculator 41 corrects the measurement value measured based on the measurement light in Step S4 by using the measurement value measured based on the reference light and stored in Step S2.

In subsequent Step S6, the calculator 41 outputs the corrected measurement value to, for example, the display unit and the storage unit.

Next, in Step S7, the calculator 41 determines whether calibration is needed. If no in Step S7, the process returns to Step S4, and the calculator 41 continues to measure the distance based on the measurement light.

If yes in Step S7, that is, for example, if a predetermined time has passed since the last calibration or if the temperature has changed by predetermined degrees or more, the routine is returned to Step S1 where switching of the liquid shutter 50 is performed again. The calculator 41 then acquires a measurement value based on the reference light again.

In this manner, the calculator 41 acquires, as appropriate, measurement values based on the reference light, and continues to acquire measurement values based on the measurement light.

Figure 3:
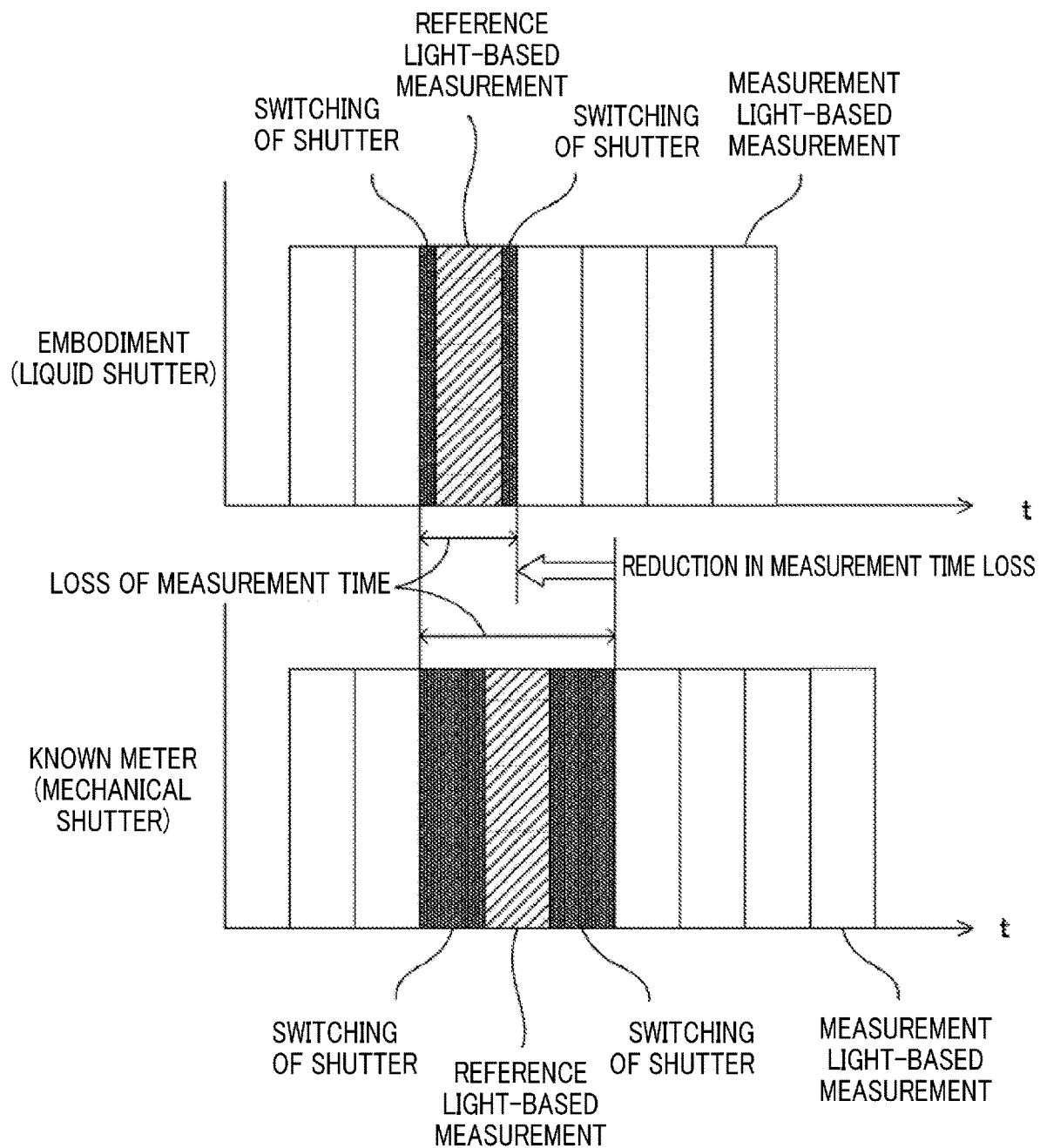
FIG. 3 is a diagram illustrating a comparison between the measurement time of the electro-optical distance meter according to the embodiment and that of an electro-optical distance meter including a mechanical shutter.

FIG. 3 illustrates a comparison between the measurement time of the electro-optical distance meter according to this embodiment and that of an electro-optical distance meter including a mechanical shutter. With reference to FIG. 3, effects of this embodiment will be described.

The upper diagram of FIG. 3 is a measurement time chart of the electro-optical distance meter 1 according to this embodiment, and the lower diagram is a measurement time chart of the known electro-optical distance meter including a mechanical shutter. The electro-optical distance meter 1 according to this embodiment and the known electro-optical distance meter both take the same measurement procedure. Both measure a distance based on the measurement light (measurement light-based measurement), switch the shutter at the same timing, and then measure a distance based on the reference light (reference light-based measurement), and switch the shutter again to return to the measurement light-based measurement.

The known electro-optical distance meter, which has the mechanical shutter, spends time equivalent to about one cycle of the measurement light-based measurement on a single switching operation of the mechanical shutter. In addition to the switching operations, the reference light-based measurement takes time. As a result, the known electro-optical distance meter suffers a measurement time loss equivalent to about three cycles of time for the measurement light-based measurement.

In contrast, the electro-optical distance meter 1 according to this embodiment, which has the liquid shutter 50 comprised of an electrowetting device, spends much less than one cycle time of the measurement light-based measurement on switching the liquid shutter. With the reference light-based measurement being included, the measurement time loss is less than two cycles of time for the measurement light-based measurement.

Since the electro-optical distance meter 1 according to this embodiment includes the liquid shutter 50 to switch back and forth between the external optical path L1 and the internal optical path L2, the electro-optical distance meter 1 can reliably shorten the time period needed for switching the shutter, as compared to an electro-optical distance meter having a mechanical shutter. This feature can reduce the loss of measurement time, and can ensure a longer time for the measurement light-based measurement.

The liquid shutter 50, which is configured to move the liquid in response to application of voltage, is less likely to suffer from mechanical friction and less likely to be damaged by an external impact. Using the liquid shutter 50 can reduce the chances of failures and increase the operational reliability of the electro-optical distance meter.

Using the liquid shutter allows the external optical path L1 and the internal optical path L2 to be arranged at a smaller spacing from each other than a case where the mechanical shutter is used. This feature enables the shutter device to have a small size in accordance with the beam size of the measurement light. As a result, electro-optical distance meter can be reduced in size.

The embodiment of the present disclosure has been described above as a mere example, and the aspects and the scope of the present disclosure are not limited to the embodiment described above.

The liquid shutter 50 according to the embodiment described above is comprised of a single electrowetting device, but the number of electrowetting devices forming the liquid shutter 50 is not limited to this.

Figure 4:
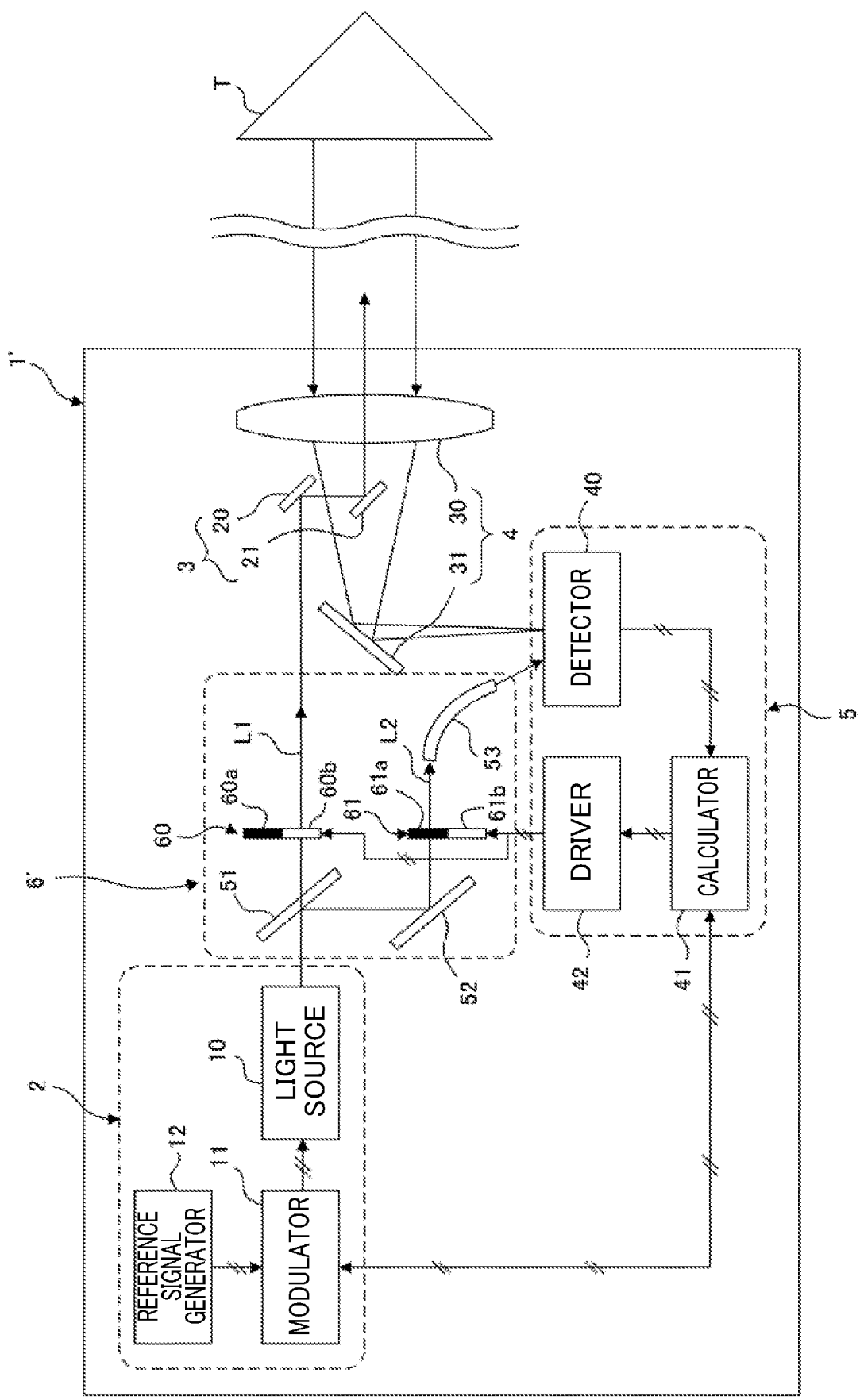
FIG. 4 is a schematic diagram illustrating a general configuration of an electro-optical distance meter including liquid shutters according to a modification of the embodiment.

For example, FIG. 4 illustrates a general configuration of an electro-optical distance meter including liquid shutters according to a modification of the embodiment. Components of the modification similar to those of the embodiment described above are denoted by the same reference characters, and detailed description thereof is omitted herein.

As illustrated in FIG. 4, this electro-optical distance meter 1' according to the modification includes, in an optical path switching unit 6', two electrowetting devices that constitute a first liquid shutter 60 and a second liquid shutter 61 as the liquid shutters of this modification.

The first liquid shutter 60 and the second liquid shutter 61 are spaced apart from each other such that the first liquid shutter 60 is disposed across the external optical path L1 and the second liquid shutter 61 is disposed across the internal optical path L2.

The first liquid shutter 60 and the second liquid shutter 61 are each a smaller version of the liquid shutter 50 of the embodiment described above. The first liquid shutter 60 and the second liquid shutter 61 have light-transmitting regions 60*b* and 61*b*, respectively, in one region, and have light-blocking regions 60*a* and 61*a*, respectively, in the other region. Each of the first and second liquid shutters 60 and 61 can cause the respective light-transmitting region and the respective light-blocking region to switch places in response to application of voltage by the driver 42.

The driver 42 switches the first liquid shutter 60 and the second liquid shutter 61 in conjunction with each other. Specifically, the first liquid shutter 60 and the second liquid shutter 61 are switched in a synchronized manner such that the first liquid shutter 60 transmits the light to the external optical path L1 while the second liquid shutter 61 blocks the light to the internal optical path L2, or that the first liquid shutter 60 blocks the light to the external optical path L1 while the second liquid shutter 61 transmits the light to the internal optical path L2.

It has been difficult to provide, in the known electro-optical distance meter, mechanical shutters at a certain spacing from each other because of the structural constraints of the mechanical shutters. Even if the mechanical shutters are provided at a spacing from each other, operating the mechanical shutters in conjunction with each other may cause a large error because opening and closing the mechanical shutters take time. In contrast, the electro-optical distance meter 1' according to this modification includes the liquid shutters 60 and 61 that are spaced apart from each other and switched in conjunction with each other. The liquid shutters 60 and 61 have a simple structure, thereby allowing for a flexible layout. In addition, the liquid shutters 60 and 61 can be switched instantaneously between a light-transmitting state and a light-blocking state. These features can prevent or reduce errors which may arise when the liquid shutters 60 and 61 are switched in conjunction with each other. Therefore, the electro-optical distance meter 1' according to this modification also can ensure a longer measurement time and higher operational reliability in the same manner as the electro-optical distance meter according to the embodiment described above, and in addition, can increase the degree of freedom of design.

In the above embodiment, the electro-optical distance meter to be used alone has been described as an example. However, the type of the electro-optical distance meter is not limited to this.

For example, the embodiment of the present disclosure can be applied to an electro-optical distance meter included in a total station. The total station can measure a distance using the electro-optical distance meter and can measure the horizontal angle and the vertical angle with respect to the collimation axis.

Specifically, in some cases, the total station measures the position of an unmanned aerial vehicle (UAV) flying in the sky to take pictures for photogrammetry, while tracking the UAV If the total station can reduce loss of measurement time, the total station misses fewer pieces of positional information of the UAV and can carry out more precise photogrammetry.

Moreover, the embodiment of the present disclosure can be applied to an electro-optical distance meter implemented as a three-dimensional (3D) scanner. The 3D scanner includes Risley prisms to change the direction of a laser beam (measurement light) in any direction. The 3D scanner scans the laser beam over a target to acquire a three-dimensional point cloud. In this case, if the 3D scanner can reduce loss of measurement time, the 3D scanner misses fewer pieces of point cloud information and can efficiently increase the density of the point cloud and improve the scanning accuracy.

What is claimed is:

1. An electro-optical distance meter comprising:
   a light source configured to emit light for distance measurement;
   a detector configured to receive the light and generate a distance measurement signal;
   an external optical path configured to guide the light from the light source to a target as measurement light;
   an internal optical path configured to guide the light from the light source directly to the detector as reference light in the same direction as the external optical path;
   a calculator configured to determine a distance from the distance measurement signal, and configured to transmit a switching signal for switching between the external optical path and the internal optical path; and
   a plate-like liquid shutter configured to select, based on the switching signal, one of the external optical path or the internal optical path as the optical path through which the light from the light source travels, by switching a region of light-blocking liquid,
   wherein the plate-like liquid shutter is disposed such that one region of the plate-like liquid shutter is located across the external optical path and one other region of the plate-like liquid shutter is located across the internal optical path, the plate-like liquid shutter being comprised of a single electrowetting device capable of switching the region of the light-blocking liquid between the one region and the one other region of the plate-like liquid shutter in response to application of voltage.

2. An electro-optical distance meter comprising:
   a light source configured to emit light for distance measurement;
   a detector configured to receive the light and generate a distance measurement signal;
   an external optical path configured to guide the light from the light source to a target as measurement light;
   an internal optical path configured to guide the light from the light source directly to the detector as reference light in the same direction as the external optical path;
   a calculator configured to determine a distance from the distance measurement signal, and configured to transmit a switching signal for switching between the external optical path and the internal optical path; and
   a plate-like liquid shutter configured to select, based on the switching signal, one of the external optical path or the internal optical path as the optical path through which the light from the light source travels, by switching a region of light-blocking liquid,
   wherein
   the plate-like liquid shutter includes a plurality of liquid shutters comprised of a plurality of electrowetting devices, a first one of the plurality of liquid shutters being disposed across the external optical path and a second one of the plurality of liquid shutters being disposed across the internal optical path, the electrowetting devices switching the regions of the light-blocking liquids of the plurality of liquid shutters in conjunction with each other such that the first one of the plurality of liquid shutters blocks the light to the external optical path while the second one of the plurality of liquid shutters transmits the light to the internal optical path or that the first one of the plurality of liquid shutters transmits the light to the external optical path while the second one of the plurality of liquid shutters blocks the light to the internal optical path.

3. The electro-optical distance meter of claim 1, wherein:
   the calculator is configured to determine whether calibration of the distance measurement is needed; and
   the liquid shutter is configured to select the internal optical path when the calculator determines that calibration is needed.

4. The electro-optical distance meter of claim 3, wherein the calculator determines that calibration is needed when a predetermined time has passed since a last calibration.

5. The electro-optical distance meter of claim 3, wherein the calculator determines that calibration is needed when the temperature has changed by a predetermined number of degrees or more.

* * * * *